(12) United States Patent
Furuta et al.

(10) Patent No.: US 12,477,246 B2
(45) Date of Patent: Nov. 18, 2025

(54) IMAGING CONTROL DEVICE, IMAGING APPARATUS, IMAGING CONTROL METHOD, AND IMAGING CONTROL PROGRAM

(71) Applicant: FUJIFILM Corporation, Tokyo (JP)

(72) Inventors: Yoshinori Furuta, Saitama (JP); Kazuya Oda, Saitama (JP); Tomoyuki Kawai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 271 days.

(21) Appl. No.: 18/315,468

(22) Filed: May 10, 2023

(65) Prior Publication Data

US 2023/0388669 A1 Nov. 30, 2023

(30) Foreign Application Priority Data

May 31, 2022 (JP) ................................ 2022-088619

(51) Int. Cl.
| | | |
|---|---|---|
| *H04N 25/771* | (2023.01) | |
| *H04N 25/50* | (2023.01) | |
| *H04N 25/531* | (2023.01) | |
| *H04N 25/713* | (2023.01) | |
| *H04N 25/77* | (2023.01) | |

(52) U.S. Cl.
CPC .......... *H04N 25/771* (2023.01); *H04N 25/50* (2023.01); *H04N 25/531* (2023.01); *H04N 25/713* (2023.01); *H04N 25/77* (2023.01)

(58) Field of Classification Search
CPC ............. H04N 25/40; H04N 25/50–59; H04N 25/713; H04N 25/77; H04N 25/771
See application file for complete search history.

(56) References Cited

U.S. PATENT DOCUMENTS

| | | | |
|---|---|---|---|
| 8,488,035 B2 | 7/2013 | Kondo et al. | |
| 9,838,632 B2* | 12/2017 | Furumochi | ............ H04N 23/71 |
| 2011/0122287 A1* | 5/2011 | Kunishige | ............ H04N 23/743 |
| | | | 348/E5.037 |

FOREIGN PATENT DOCUMENTS

| | | |
|---|---|---|
| JP | 2008028516 | 2/2008 |
| JP | 2012070056 | 4/2012 |

* cited by examiner

*Primary Examiner* — Lin Ye
*Assistant Examiner* — Chriss S Yoder, III
(74) *Attorney, Agent, or Firm* — JCIPRNET

(57) ABSTRACT

An imaging control device that controls an imaging unit including an imaging element in which a plurality of pixels each including a photoelectric conversion unit and a charge holding unit which holds electric charges to be transferred from the photoelectric conversion unit are two-dimensionally disposed, includes a processor, and the processor is configured to: perform a first control of starting exposure of the plurality of pixels at a first timing and of transferring electric charges accumulated in the photoelectric conversion units of the plurality of pixels by the exposure to the charge holding units at a second timing; perform a second control of reading out signals corresponding to the electric charges transferred to the charge holding units by the first control; and perform a third control as defined herein.

20 Claims, 7 Drawing Sheets

IMAGING CONTROL DEVICE, IMAGING APPARATUS, IMAGING CONTROL METHOD, AND IMAGING CONTROL PROGRAM

CROSS-REFERENCE TO RELATED APPLICATIONS

The present application claims priority under 35 U.S.C. § 119 to Japanese Patent Application No. 2022-088619, filed on May 31, 2022. The above application is hereby expressly incorporated by reference, in its entirety, into the present application.

BACKGROUND OF THE INVENTION

1. Field of the Invention

The present invention relates to an imaging control device, an imaging apparatus, an imaging control method, and a computer readable medium storing an imaging control program.

2. Description of the Related Art

JP2008-28516A discloses a camera system including an imaging element that determines an exposure time by resetting signals of a photoelectric conversion unit at the same time for all pixels and by transmitting the signals to an accumulation unit from the photoelectric conversion unit after a predetermined time and then, sequentially reads out the signals from the pixels, and an incidence ray quantity suppression unit that suppresses a light quantity incident on the imaging element during an operation of reading out the signal from each pixel of the imaging element.

JP2012-70056A discloses an imaging apparatus including a detection unit that detects a pixel of which an output level of an imaging signal is a level close to saturation and is decreased by an increase in a signal charge amount held in a charge holding unit because of an effect of a high-brightness subject.

SUMMARY OF THE INVENTION

The disclosed technology is as follows.

(1) An imaging control device that controls an imaging unit including an imaging element in which a plurality of pixels each including a photoelectric conversion unit and a charge holding unit which holds charges transferred from the photoelectric conversion unit are two-dimensionally disposed, the imaging control device comprising a processor, in which the processor is configured to perform a first control of starting exposure of the plurality of pixels at a first timing and of transferring charges accumulated in the photoelectric conversion units of the plurality of pixels by the exposure to the charge holding units at a second timing, perform a second control of reading out signals corresponding to the charges transferred to the charge holding units by the first control, and perform a third control of acquiring captured image data obtained by imaging a subject via the imaging element in a second period different from a first period in which the first control is performed, and of controlling, based on the captured image data, an operation condition of the imaging unit in a period in which the second control is performed.

(2) The imaging control device according to (1), in which the first period does not overlap with the second period.

(3) The imaging control device according to (2), in which the processor is configured to acquire a brightness distribution of the subject imaged by the imaging element based on the captured image data and control the operation condition based on the brightness distribution.

(4) The imaging control device according to (3), in which the second period is a period before the first timing, and the processor is configured to acquire the captured image data in the second period by imaging the subject via the imaging element with an exposure value lower than an exposure value in the first period.

(5) The imaging control device according to (3), in which the processor is configured to, in the imaging in the second period, perform a control of reading out a signal from the group in a case where the plurality of pixels are divided into a plurality of groups, and acquire the captured image data configured with image data corresponding to the group, and perform imaging with a first exposure value for a first group that is a part of the plurality of groups, and perform imaging with a second exposure value lower than the first exposure value for a second group except the first group among the plurality of groups.

(6) The imaging control device according to (5), in which the processor is configured to, perform a display control of a live view image based on the image data corresponding to the first group, and acquire the brightness distribution based on the image data corresponding to the second group.

(7) The imaging control device according to any one of (3) to (6), in which the processor is configured to, based on the brightness distribution, detect a high-brightness region in which brightness is greater than or equal to a threshold value in the subject being imaged, acquire a plurality of pieces of the captured image data by executing imaging a plurality of times in the second period, and in a case where a determination that the high-brightness region detected based on the plurality of pieces of captured image data is moving between the plurality of times imaging is made, change the operation condition from a first condition to a second condition.

(8) The imaging control device according to any one of (1) to (7), in which the imaging unit includes a first optical element with which a quantity of an incidence ray on the imaging element is changeable, and the operation condition is a condition related to operation of the first optical element.

(9) The imaging control device according to (8), in which the third control includes a control of controlling the first optical element to decrease the quantity of the incidence ray in the period in which the second control is performed below the quantity of the incidence ray on the imaging element in a period in which the first control is performed.

(10) The imaging control device according to any one of (1) to (9), in which the imaging unit includes a focus lens, and the operation condition is a condition related to operation of the focus lens.

(11) The imaging control device according to (10), in which the third control includes a control of stopping driving of the focus lens.

(12) The imaging control device according to any one of (1) to (11), in which the operation condition is a condition related to a readout operation of the signals from a plurality of charge holding units.

(13) The imaging control device according to (12), in which the third control includes a control of setting a readout speed of the signals from the charge holding units to a first speed and a control of setting the readout speed to a second speed higher than the first speed.

(14) The imaging control device according to (12), in which the operation condition is a condition related to a readout order of the signals from the plurality of charge holding units.

(15) The imaging control device according to (14), in which the processor is configured to acquire a brightness distribution of the subject imaged by the imaging element based on the captured image data, detect a high-brightness region based on the brightness distribution, and in a case where a determination that the high-brightness region is present is made, determine the readout order of the signals based on a position of the pixel in which an image of the high-brightness region is formed.

(16) An imaging control device that controls an imaging unit including an imaging element in which a plurality of pixels each including a photoelectric conversion unit and a charge holding unit which holds charges transferred from the photoelectric conversion unit are two-dimensionally disposed, the imaging control device comprising a processor, in which the processor is configured to perform a first imaging control of imaging a subject via the imaging element with a first exposure value, perform a second imaging control of imaging the subject via the imaging element with a second exposure value lower than the first exposure value, and acquire a brightness distribution of the subject imaged by the imaging element based on captured image data acquired from the imaging element by the second imaging control and perform a specific control based on the brightness distribution.

(17) The imaging control device according to (16), in which the processor is configured to, based on the brightness distribution, detect a high-brightness region in which brightness is greater than or equal to a threshold value, and in a case where the high-brightness region is present, perform the specific control.

(18) The imaging control device according to (17), in which the processor is configured to acquire a plurality of pieces of the captured image data by executing the second imaging control a plurality of times, and in a case where a determination that the high-brightness region detected based on the plurality of pieces of captured image data is moving between the plurality of times imaging is made, perform the specific control.

(19) An imaging control device that controls an imaging unit including an imaging element in which a plurality of pixels each including a photoelectric conversion unit and a charge holding unit which holds charges transferred from the photoelectric conversion unit are two-dimensionally disposed, the imaging control device comprising a processor, in which the processor is configured to perform an imaging control of imaging a subject via the imaging element, in imaging in the imaging control, perform a control of reading out a signal from the group in a case where the plurality of pixels are divided into a plurality of groups, and acquire captured image data configured with image data corresponding to the group, perform imaging with a first exposure value for a first group that is a part of the plurality of groups, and perform imaging with a second exposure value lower than the first exposure value for a second group except the first group among the plurality of groups, and acquire a brightness distribution of the subject imaged by the imaging element based on the captured image data and perform a specific control based on the brightness distribution.

(20) The imaging control device according to (19), in which the processor is configured to perform a display control of a live view image based on the image data corresponding to the first group, and acquire the brightness distribution based on the image data corresponding to the second group.

(21) An imaging apparatus comprising the imaging control device according to any one of (1) to (20), and the imaging unit.

(22) An imaging control method for controlling an imaging unit including an imaging element in which a plurality of pixels each including a photoelectric conversion unit and a charge holding unit which holds charges transferred from the photoelectric conversion unit are two-dimensionally disposed, the imaging control method comprising performing a first control of starting exposure of the plurality of pixels at a first timing and of transferring charges accumulated in the photoelectric conversion units of the plurality of pixels by the exposure to the charge holding units at a second timing, performing a second control of reading out signals corresponding to the charges transferred to the charge holding units by the first control, and performing a third control of acquiring captured image data obtained by imaging a subject via the imaging element in a second period different from a first period in which the first control is performed, and of controlling, based on the captured image data, an operation condition of the imaging unit in a period in which the second control is performed.

(23) A computer readable medium storing an imaging control program for controlling an imaging unit including an imaging element in which a plurality of pixels each including a photoelectric conversion unit and a charge holding unit which holds charges transferred from the photoelectric conversion unit are two-dimensionally disposed, the imaging control program causing a processor to execute performing a first control of starting exposure of the plurality of pixels at a first timing and of transferring charges accumulated in the photoelectric conversion units of the plurality of pixels by the exposure to the charge holding units at a second timing, performing a second control of reading out signals corresponding to the charges transferred to the charge holding units by the first control, and performing a third control of acquiring captured image data obtained by imaging a subject via the imaging element in a second period different from a first period in which the first control is performed, and of controlling, based on the captured image data, an operation condition of the imaging unit in a period in which the second control is performed.

DESCRIPTION OF THE PREFERRED EMBODIMENTS

Figure 1:
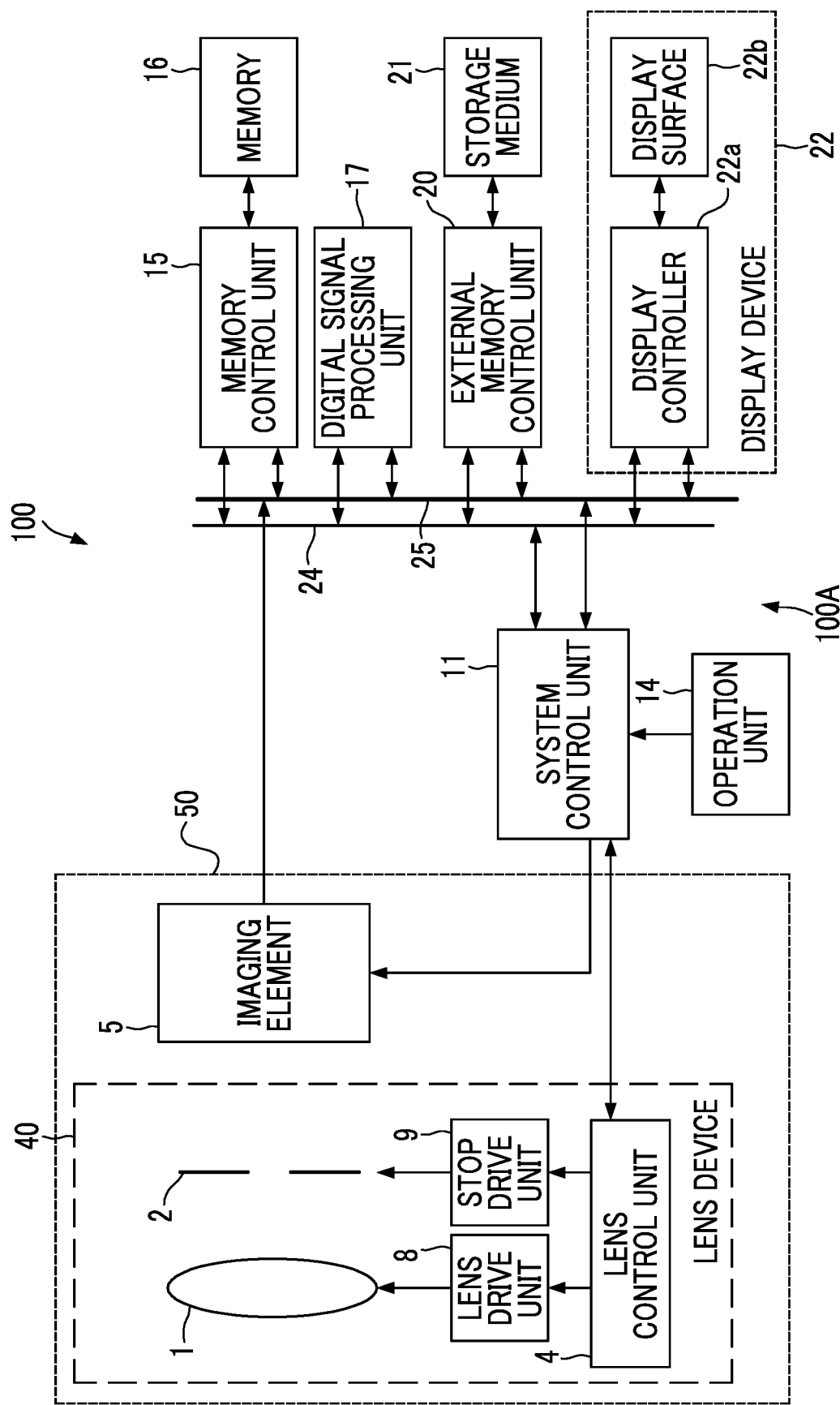
FIG. 1 is a diagram illustrating a schematic configuration of a digital camera 100 that is one embodiment of an imaging apparatus according to the present invention.

FIG. 1 is a diagram illustrating a schematic configuration of a digital camera 100 that is one embodiment of an imaging apparatus according to the present invention. The digital camera 100 illustrated in FIG. 1 comprises a lens device 40 including an imaging lens 1, a stop 2, a lens drive unit 8 that drives the imaging lens 1, a stop drive unit 9 that drives the stop 2, and a lens control unit 4 that controls the lens drive unit 8 and the stop drive unit 9, and a body part 100A.

The body part 100A comprises an imaging element 5, a system control unit 11 that controls the entire electric control system of the digital camera 100, an operation unit 14, a display device 22, a memory 16 including a random access memory (RAM), a read only memory (ROM), and the like, and a memory control unit 15 that controls data storage in the memory 16 and data readout from the memory 16, a digital signal processing unit 17, and an external memory control unit 20 that controls data storage in a storage medium 21 and data readout from the storage medium 21.

The lens device 40 may be attachable to and detachable from the body part 100A or may be integrated with the body part 100A. The imaging lens 1 includes a focus lens or the like that can be moved in an optical axis direction. The focus lens is a lens for adjusting a focal point of an imaging optical system including the imaging lens 1 and the stop 2, and is composed of a single lens or of a plurality of lenses. By moving the focus lens in the optical axis direction, a position of a principal point of the focus lens changes along the optical axis direction, and a focal position on a subject side is changed. A liquid lens of which a position of a principal point in the optical axis direction can be changed by electrical control may be used as the focus lens.

The stop 2 is an optical element that can change a quantity of an incidence ray on the imaging element 5. The lens device 40 may further include a neutral density (ND) filter as an optical element that can change the quantity of the incidence ray on the imaging element 5. A ND filter of which transmittance of light is electrically controlled in order to change the quantity of the incidence ray on the imaging element 5 may be used. Alternatively, a ND filter configured to be placed on and retracted from an optical path (to reduce transmittance of light in a case where the ND filter is placed on the optical path) in order to change the quantity of the incidence ray on the imaging element 5 may be used. Each of the stop 2 and the ND filter constitutes a first optical element.

The lens control unit 4 of the lens device 40 changes the position of the principal point of the focus lens included in the imaging lens 1 by controlling the lens drive unit 8 based on a lens drive signal transmitted from the system control unit 11. The lens control unit 4 of the lens device 40 changes an amount of opening (F number) of the stop 2 by controlling the stop drive unit 9 based on a driving control signal transmitted from the system control unit 11. In a case where the ND filter is included in the lens device 40, the lens control unit 4 electrically controls the transmittance of the ND filter or causes the ND filter to be placed on and retracted from the optical path in accordance with an instruction from the system control unit 11.

The imaging element 5 images a subject through the imaging optical system including the imaging lens 1 and the stop 2 (furthermore, the ND filter). The imaging element 5 includes a light-receiving surface 60 (refer to FIG. 2) on which a plurality of pixels are two-dimensionally disposed, converts a subject image formed on the light-receiving surface 60 by the imaging optical system into pixel signals via the plurality of pixels, and outputs the pixel signals. For example, a complementary metal-oxide semiconductor (CMOS) image sensor is used as the imaging element 5. The imaging element 5 and the lens device 40 constitute an imaging unit 50.

The system control unit 11 controls the entire digital camera 100 and has a hardware structure corresponding to various processors that perform processing by executing programs including an imaging control program. The programs executed by the system control unit 11 are stored in the ROM of the memory 16.

Examples of the various processors include a central processing unit (CPU) that is a general-purpose processor performing various types of processing by executing a program, a programmable logic device (PLD) such as a field programmable gate array (FPGA) that is a processor of which a circuit configuration can be changed after manufacture, or a dedicated electric circuit such as an application specific integrated circuit (ASIC) that is a processor having a circuit configuration dedicatedly designed to execute specific processing. More specifically, the various processors have a structure of an electric circuit in which circuit elements such as semiconductor elements are combined.

The system control unit 11 may be configured with one of the various processors or may be configured with a combination of two or more processors of the same type or of different types (for example, a combination of a plurality of FPGAs or a combination of a CPU and a FPGA).

The system control unit 11 drives the imaging element 5 and the lens device 40 and outputs the subject image captured through the imaging optical system of the lens device 40 as an image signal in accordance with the imaging control program. The system control unit 11 and the memory 16 constitute an imaging control device that controls the imaging unit 50. By processing the image signal output from the imaging element 5 via the digital signal processing unit 17, captured image data that is data suitable for display on the display device 22 or is data suitable for storage in the storage medium 21 is generated.

A command signal from a user is input into the system control unit 11 through the operation unit 14. The operation unit 14 includes a touch panel integrated with a display surface 22b, and various buttons and the like.

The display device 22 comprises the display surface 22b configured with an organic electroluminescence (EL) panel, a liquid crystal panel, or the like, and a display controller 22a that controls display on the display surface 22b.

The memory control unit 15, the digital signal processing unit 17, the external memory control unit 20, and the display controller 22a are connected to each other through a control bus 24 and through a data bus 25 and are controlled in accordance with instructions from the system control unit 11.

Figure 2:
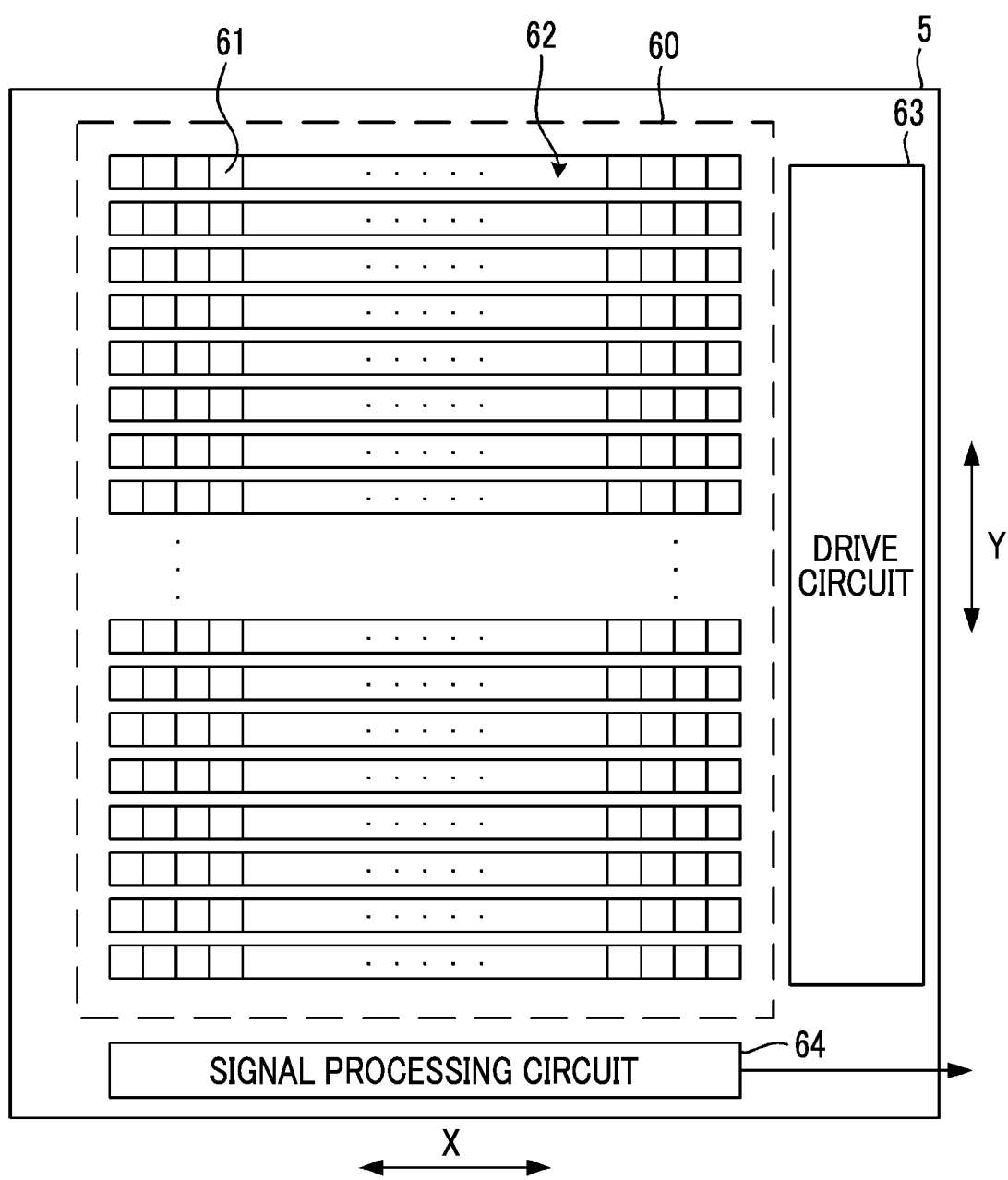
FIG. 2 is a schematic plan view illustrating a schematic configuration of an imaging element 5 illustrated in FIG. 1.
Figure 3:
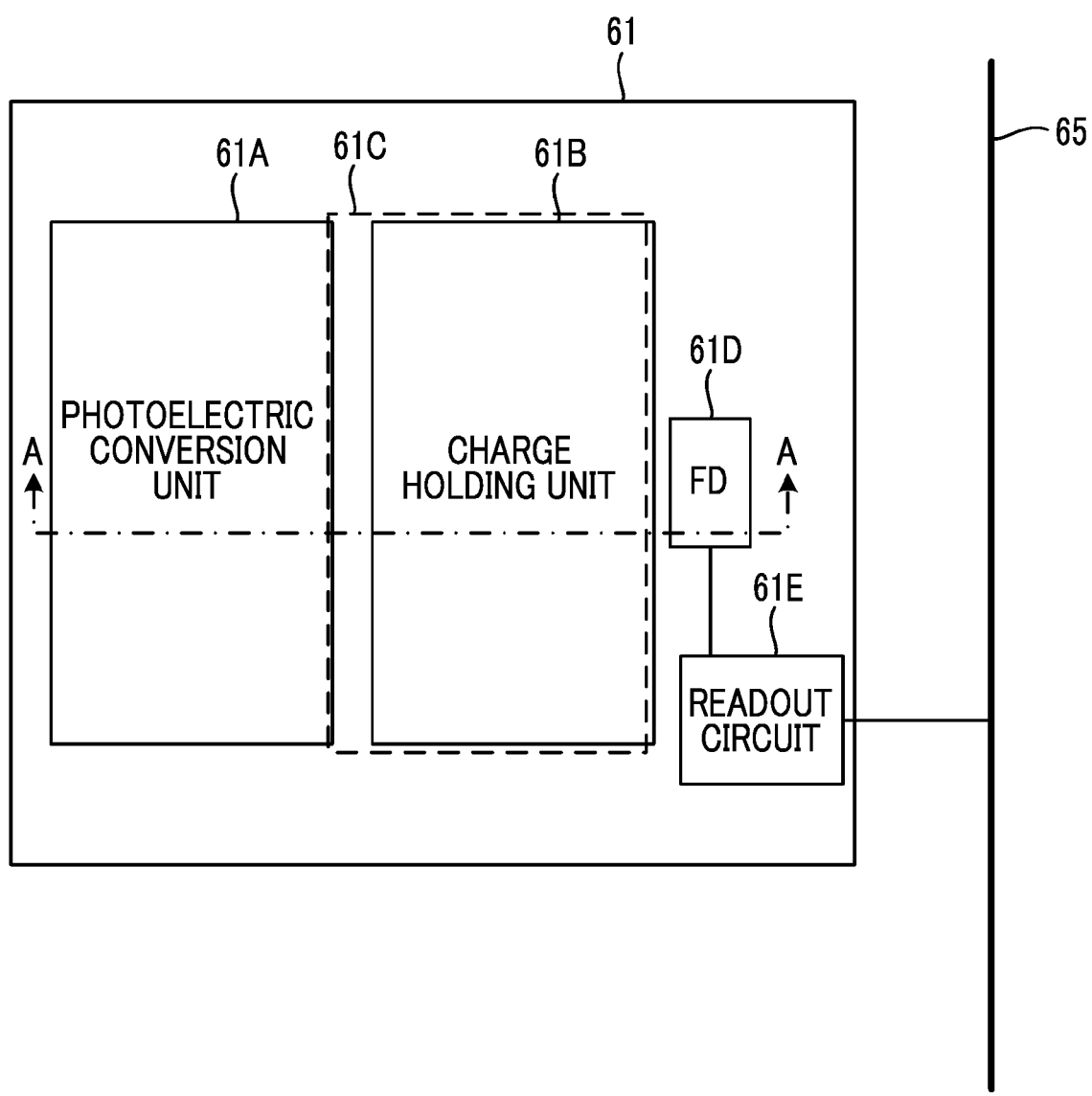
FIG. 3 is a schematic plan view illustrating a schematic configuration of a pixel 61 in the imaging element 5 illustrated in FIG. 2.
Figure 4:
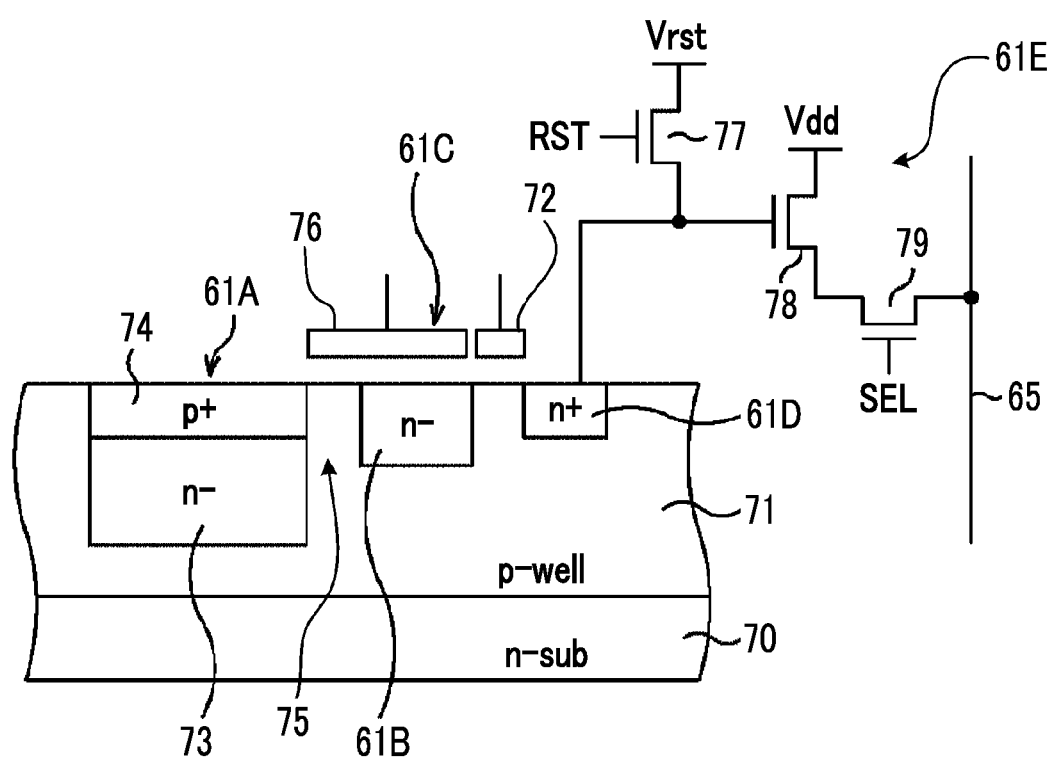
FIG. 4 is a schematic cross section view of the pixel 61 illustrated in FIG. 3 taken along line A-A.

FIG. 2 is a schematic plan view illustrating a schematic configuration of the imaging element 5 illustrated in FIG. 1. FIG. 3 is a schematic plan view illustrating a schematic configuration of a pixel 61 in the imaging element 5 illustrated in FIG. 2. FIG. 4 is a schematic cross section view of the pixel 61 illustrated in FIG. 3 taken along line A-A.

The imaging element 5 comprises the light-receiving surface 60 on which a plurality of pixel rows 62 each consisting of a plurality of the pixels 61 arranged in a row direction X are arranged in a column direction Y orthogonal to the row direction X, a drive circuit 63 that drives the pixels 61 arranged on the light-receiving surface 60, and a signal processing circuit 64 that processes a pixel signal read out into a signal line from each pixel 61 of the pixel rows 62 arranged on the light-receiving surface 60.

The plurality of pixels 61 include a phase difference detection pixel that receives one of a pair of luminous fluxes which have passed through two different parts arranged in the row direction X in a pupil region of the imaging optical system, and that detects a signal corresponding to an amount of received light, a phase difference detection pixel that receives the other of the pair of luminous fluxes and that detects a signal corresponding to an amount of received light, and a normal pixel that receives both of the pair of luminous fluxes and that detects a signal corresponding to an amount of received light.

The pixel rows 62 include a first pixel row including only the normal pixel, and a second pixel row including the phase difference detection pixel and the normal pixel. The second pixel rows are discretely disposed at equal intervals in the column direction Y. In the imaging element 5, the phase difference detection pixel is not essential, and all of the pixels 61 may be configured with the normal pixels.

Hereinafter, in FIG. 2, an end part on an upper side of the light-receiving surface 60 in the column direction Y will be referred to as an upper end, and an end part on a lower side of the light-receiving surface 60 in the column direction Y will be referred to as a lower end. The upper end constitutes one end of the light-receiving surface 60, and the lower end constitutes the other end of the light-receiving surface 60.

As illustrated in FIG. 3, each pixel 61 comprises a photoelectric conversion unit 61A, a charge holding unit 61B, a charge transfer unit 61C, a floating diffusion 61D, and a readout circuit 61E.

The photoelectric conversion unit 61A receives light that has passed through the imaging optical system of the lens device 40, and generates and accumulates charges corresponding to an amount of received light. The photoelectric conversion unit 61A is configured with a photodiode or the like.

The charge transfer unit 61C transfers the charges accumulated in the photoelectric conversion unit 61A to the charge holding unit 61B. The charge transfer unit 61C is configured with an impurity region in a semiconductor substrate and with an electrode formed above the impurity region.

The charges are transferred from the photoelectric conversion unit 61A to the charge holding unit 61B by causing the drive circuit 63 to control a voltage applied to the electrode constituting the charge transfer unit 61C.

The charge holding unit 61B holds the charges transferred from the photoelectric conversion unit 61A by the charge transfer unit 61C. The charge holding unit 61B is configured with the impurity region in the semiconductor substrate.

The floating diffusion 61D is used for converting charges into signals, to which the charges held in the charge holding unit 61B are transferred.

The readout circuit 61E is a circuit that reads out a signal corresponding to a potential of the floating diffusion 61D into a signal line 65 as a pixel signal. The readout circuit 61E is driven by the drive circuit 63.

As illustrated in FIG. 4, a P-well layer 71 is formed on a surface of an N-type substrate 70, and the photoelectric conversion unit 61A is formed in a surface part of the P-well layer 71.

The photoelectric conversion unit 61A is configured with an N-type impurity layer 73 and with a P-type impurity layer 74 formed on the N-type impurity layer 73. The N-type substrate 70 and the P-well layer 71 constitute the semiconductor substrate.

The charge holding unit 61B consisting of an N-type impurity layer is formed in the surface part of the P-well layer 71 to be slightly spaced from the photoelectric conversion unit 61A.

A transfer electrode 76 is formed above a region 75 of the P-well layer 71 between the charge holding unit 61B and the photoelectric conversion unit 61A through an oxide film, not illustrated.

The region 75 and the transfer electrode 76 constitute the charge transfer unit 61C. While the transfer electrode 76 is also formed above the charge holding unit 61B in the example in FIG. 3, the transfer electrode 76 may be formed above at least the region 75.

The charges accumulated in the photoelectric conversion unit 61A can be transferred to the charge holding unit 61B by controlling a potential of the transfer electrode 76 to form a channel in the region 75. The potential of the transfer electrode 76 is controlled by the drive circuit 63.

The floating diffusion 61D consisting of an N-type impurity layer is formed in the surface part of the P-well layer 71 to be slightly spaced from the charge holding unit 61B.

A readout electrode 72 is formed above the P-well layer 71 between the charge holding unit 61B and the floating diffusion 61D through an oxide film, not illustrated.

The charges held in the charge holding unit 61B can be transferred to the floating diffusion 61D by controlling a potential of the readout electrode 72 to form a channel in a region between the charge holding unit 61B and the floating diffusion 61D. The potential of the readout electrode 72 is controlled by the drive circuit 63.

In the example illustrated in FIG. 4, the readout circuit 61E is configured with a reset transistor 77 for resetting the potential of the floating diffusion 61D, an output transistor 78 that converts the potential of the floating diffusion 61D into a pixel signal and that outputs the pixel signal, and a selection transistor 79 for selectively reading out the pixel signal output from the output transistor 78 into the signal line 65. The configuration of the readout circuit is merely an example, and the present invention is not limited thereto. The readout circuit 61E may be shared by the plurality of pixels 61.

In each pixel 61, a light shielding film, not illustrated, is provided, and a region other than the photoelectric conversion unit 61A is shielded from light by the light shielding film.

The structure of each pixel 61 illustrated in FIG. 3 and in FIG. 4 is merely an example, and the present invention is not limited thereto.

The drive circuit 63 illustrated in FIG. 2 performs, by independently driving the transfer electrode 76, the readout electrode 72, and the readout circuit 61E of each pixel 61 for each pixel row 62, reset of each photoelectric conversion unit 61A included in the pixel row 62 (discharge of the charges accumulated in the photoelectric conversion unit 61A), readout of a pixel signal corresponding to the charges accumulated in each photoelectric conversion unit 61A into the signal line 65, and the like.

In addition, the drive circuit 63 transfers the charges from the photoelectric conversion unit 61A to the charge holding unit 61B of each pixel 61 at the same time by driving the charge transfer units 61C of all of the pixels 61 at the same time. The drive circuit 63 is controlled by the system control unit 11.

The reset of the photoelectric conversion unit 61A is performed by setting the charge transfer unit 61C to a state of being able to transfer the charges and by resetting the floating diffusion 61D via the reset transistor 77 in a state where a channel is formed in the semiconductor substrate below the readout electrode 72.

Thus, in a state where the readout of the pixel signal corresponding to the charges held in the charge holding unit 61B is completed, the reset of the photoelectric conversion unit 61A (in other words, a start of exposure of the photoelectric conversion unit 61A) that transfers the charges to the charge holding unit 61B can be performed.

The signal processing circuit 64 illustrated in FIG. 2 performs correlative double sampling processing on the pixel signal read out into the signal line 65 from each pixel 61 of the pixel row 62, converts the pixel signals after the correlative double sampling processing into a digital signal, and outputs the digital signal to the data bus 25 (refer to FIG. 1). The signal processing circuit 64 is controlled by the system control unit 11. The digital signal processing unit 17 generates the captured image data by performing signal processing such as demosaicing and gamma-correction processing on a pixel signal group output to the data bus 25 from the imaging element 5.

The system control unit 11 can drive the imaging element 5 in each of global reset driving, global shutter driving, rolling reset driving, rolling shutter driving, first rolling readout driving, and second rolling readout driving.

The global reset driving is driving of starting exposure of each pixel 61 at the same time by resetting the photoelectric conversion unit 61A of each pixel 61 formed on the light-receiving surface 60 of the imaging element 5 at the same time.

The global shutter driving is driving of ending the exposure in each pixel 61 at the same time by transferring the charges accumulated in the photoelectric conversion unit 61A of each pixel 61 because of the exposure started in each pixel 61 by the global reset driving to the charge holding unit 61B at the same time.

The rolling reset driving is driving of sequentially performing, while changing the pixel row 62, processing of resetting each photoelectric conversion unit 61A of the pixel row 62 to start the exposure of each photoelectric conversion unit 61A.

The rolling shutter driving is driving of sequentially performing, while changing the pixel row 62, processing of transferring the charges from the photoelectric conversion units 61A of the exposed pixel row 62 to the charge holding units 61B of the pixel row 62 to end the exposure of the pixel row 62.

The first rolling readout driving is driving of sequentially reading out, for each pixel row 62, the pixel signal corresponding to the charges held in each charge holding unit 61B by the global shutter driving.

The second rolling readout driving is driving of sequentially performing, while changing the pixel row 62, the readout of the pixel signals corresponding to the charges held in the charge holding units 61B of the pixel row 62 by the rolling shutter driving.

In a case where the digital camera 100 is set to an imaging mode, the system control unit 11 continuously performs imaging for live view image display (hereinafter, referred to as LV imaging) based on a set of, for example, the rolling reset driving, the rolling shutter driving, and the second rolling readout driving. The system control unit 11 may perform the LV imaging based on a set of the global reset driving, the global shutter driving, and the first rolling readout driving.

In a case where an instruction (hereinafter, referred to as an imaging instruction) to perform imaging for storage for storing still image data in the storage medium 21 is received during execution of the set, the system control unit 11 performs the imaging for storage based on a set of the global reset driving, the global shutter driving, and the first rolling readout driving. The digital signal processing unit 17 illustrated in FIG. 1 generates the captured image data by processing the pixel signal group output from the imaging element 5 by the imaging for storage and stores the captured image data in the storage medium 21.

Figure 5:
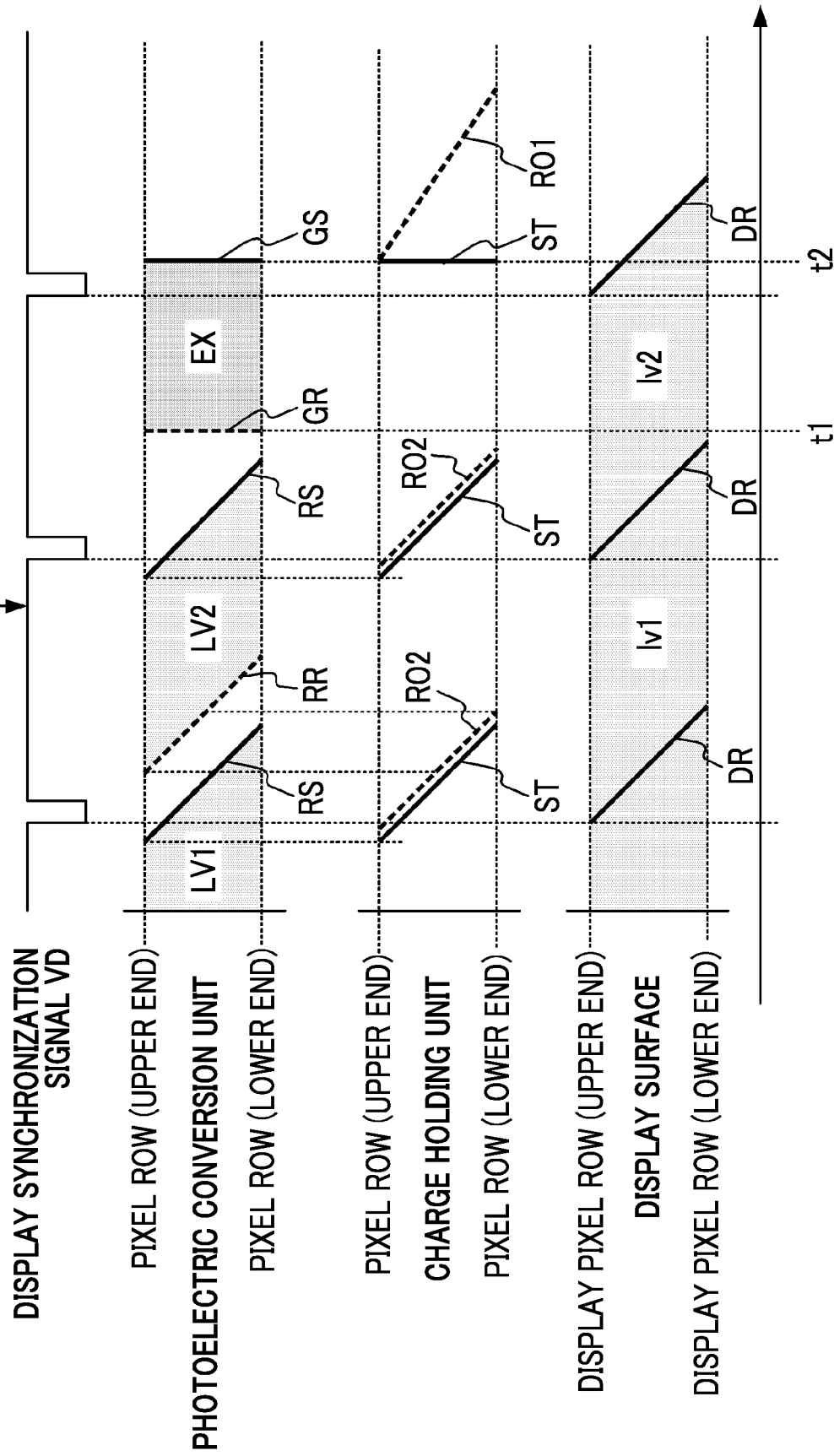
FIG. 5 is a timing chart illustrating operation of the digital camera 100 illustrated in FIG. 1 in an imaging mode.

FIG. 5 is a timing chart illustrating operation of the digital camera 100 illustrated in FIG. 1 in the imaging mode. In FIG. 5, a horizontal axis denotes a time point. A display synchronization signal VD supplied to the display controller 22a is illustrated in the upper part of FIG. 5.

Driving timings of the photoelectric conversion units 61A and the charge holding units 61B of each pixel row 62 of the imaging element 5 are illustrated in the middle part of FIG. 5. In the middle part of FIG. 5, a vertical axis denotes a position of the pixel row 62 in the column direction Y.

Straight line RR illustrated in the middle part of FIG. 5 illustrates a timing at which the reset of each photoelectric conversion unit 61A included in the pixel row 62 is performed by the rolling reset driving.

Straight line RS illustrated in the middle part of FIG. 5 illustrates a timing at which the exposure of each photoelectric conversion unit 61A included in the pixel row 62 is ended by the rolling shutter driving.

A period surrounded by straight line RR and by straight line RS on the right side of straight line RR indicates an exposure period (LV1 and LV2) of the imaging element 5 in the LV imaging.

Straight line GR illustrated in the middle part of FIG. 5 illustrates a timing at which the reset of each photoelectric conversion unit 61A included in the pixel row 62 is performed by the global reset driving.

Straight line GS illustrated in the middle part of FIG. 5 illustrates a timing at which the charges are transferred from each photoelectric conversion unit 61A included in the pixel row 62 to the charge holding unit 61B by the global shutter driving.

A period surrounded by straight line GR and by straight line GS indicates an exposure period EX of the imaging element 5 in the imaging for storage.

Straight line ST illustrated in the middle part of FIG. 5 illustrates a timing at which the charges are held in the charge holding unit 61B.

Straight line RO1 illustrated in the middle part of FIG. 5 illustrates a timing at which the pixel signals corresponding to the charges held in the charge holding units 61B are output from the imaging element 5 by the first rolling readout driving.

Straight line RO2 illustrated in the middle part of FIG. 5 illustrates a timing at which the pixel signals corresponding to the charges held in the charge holding units 61B are output from the imaging element 5 by the second rolling readout driving.

A drawing state of the display surface 22b is illustrated in the lower part of FIG. 5. In the lower part of FIG. 5, a vertical axis denotes a position of a display pixel row of the display surface 22b in the column direction Y.

Straight line DR illustrated in the lower part of FIG. 5 illustrates a timing at which drawing is performed in the display pixel row of the display surface 22b.

In a case where the imaging mode is set, the system control unit 11 repeatedly executes a set of the rolling reset driving illustrated by straight line RR, the rolling shutter driving illustrated by straight line RS, and the second rolling readout driving illustrated by straight line RO2 at a predetermined interval.

In a case where the pixel signals are output from the pixel row 62 by the driving illustrated by straight line RO2 of the set, line data is generated based on the pixel signals, and a line image based on the line data is drawn in the display pixel row corresponding to the pixel row 62.

A period in which a live view image obtained in the exposure period LV1 is displayed is denoted by "lv1" illustrated in FIG. 5. A period in which a live view image obtained in the exposure period LV2 is displayed is denoted by "lv2" illustrated in FIG. 5.

In a case where the imaging instruction is provided while the set for the LV imaging is performed, the system control unit 11 ends the set being executed when the imaging instruction is received, and then, performs the global reset driving illustrated by straight line GR at time point t1 to reset the photoelectric conversion unit 61A at the same time in all of the pixel rows 62. Accordingly, exposure is started at the same timing in all of the pixel rows 62. Then, in a case where a predetermined exposure time elapses, the system control unit 11 performs the global shutter driving illustrated by straight line GS at time point t2. By this driving, the charges are transferred from the photoelectric conversion unit 61A to the charge holding unit 61B at the same time in all of the pixel rows 62, and the charges are held in the charge holding unit 61B as illustrated by straight line ST. Accordingly, exposure ends at the same timing in all of the pixel rows 62.

In FIG. 5, a period surrounded by straight line GR and by straight line GS is illustrated as the exposure period EX for the imaging for storage. In a case where the global shutter driving is performed at time point t2, the charges that have occurred because of the exposure period EX in each photoelectric conversion unit 61A are transferred to the charge holding unit 61B (straight line ST in FIG. 5).

Time point t1 constitutes a first timing, and time point t2 constitutes a second timing. The global reset driving performed between time point t1 and time point t2 and the global shutter driving constitute a first control or a first imaging control. The exposure period EX constitutes a first period.

After performing the global shutter driving illustrated by straight line GS, the system control unit 11 performs the first rolling readout driving illustrated by straight line RO1. In the first rolling readout driving, for example, the system control unit 11 sequentially selects the pixel rows 62 from the upper end toward the lower end of the light-receiving surface 60 and reads out the pixel signals from the selected pixel row 62.

The first rolling readout driving illustrated by straight RO1 constitutes a second control. Hereinafter, a period in which the first rolling readout driving illustrated by straight line RO1 is performed (that is, a period in which the second control is performed) will be referred to as a signal readout period. The pixel signal group output from the imaging element 5 in the signal readout period is processed into the captured image data by the digital signal processing unit 17 and is stored in the storage medium 21.

The signal readout period is lengthened as the number of pixels of the captured image data (the number of pixels 61 from which signal readout is to be performed) is increased. The charge holding unit 61B is shielded from light. However, in a case where the light shielding film above the charge holding unit 61B is irradiated with light in the signal readout period, charges that have not occurred in the exposure period EX may occur below a region irradiated with the light as leaking charges because of an effect of the light. As the signal readout period is increased, a length of time in which the irradiation with light is performed is increased. Thus, an amount of the leaking charges tends to be increased. In addition, as intensity of light is increased, the amount of the leaking charges tends to be increased.

In the present embodiment, the system control unit 11 determines whether or not the leaking charges that may affect image quality of the captured image data occur, before the signal readout period ends.

Specifically, the system control unit 11 acquires the captured image data by imaging the subject via the imaging element 5 in a period (for example, the exposure period LV2) different from the exposure period EX and performs a third control of controlling an operation condition of the imaging unit 50 in the signal readout period based on the captured image data.

In a case where a determination that the leaking charges that may affect the image quality of the captured image data obtained in the exposure period EX occur is made based on the captured image data obtained in the exposure period LV2, the system control unit 11 changes the operation condition of the imaging unit 50 (that is, controls the operation condition of the imaging unit 50) in the signal readout period with respect to a case where a determination that the leaking charges that may affect the image quality of the captured image data obtained in the exposure period EX do not occur is made. Changing of the operation condition of the imaging unit 50 constitutes a specific control.

The operation condition of the imaging unit 50 includes a condition related to operation of the stop 2 (specifically, setting of the F number), a condition related to operation of the ND filter (specifically, setting of the transmittance of light), a condition related to operation of the focus lens (specifically, setting of the position of the principal point of the focus lens), and a condition related to a readout operation of the pixel signal from the charge holding unit 61B of each pixel 61 (specifically, setting of a readout speed of the pixel signal or setting of a readout order of the pixel signal), and the like.

For example, a case where an exposure value (a value determined by a combination of the exposure time, imaging sensitivity, and the F number of the stop 2 (and/or the transmittance of the ND filter)) in the exposure period EX is manually set by the user is assumed. In this case, the system control unit 11 sets the exposure value in the LV imaging to be lower than the exposure value set by the user. As a method of decreasing the exposure value, at least one of a method of shortening the exposure time, a method of decreasing the imaging sensitivity, a method of increasing the F number of the stop 2, or a method of decreasing the transmittance of the ND filter may be employed.

For example, the system control unit 11 acquires the captured image data output and generated from the imaging element 5 in the LV imaging in the exposure period LV2 and acquires a brightness distribution of the subject imaged by the imaging element 5 based on the captured image data. Based on the brightness distribution, the system control unit 11 detects a high-brightness region in which brightness is greater than or equal to a threshold value in the subject imaged by the imaging element 5.

The exposure period LV2 constitutes a second period. The second period is a period different from the first period in which the imaging for storage is performed, and is a period that does not overlap with the first period. A control for executing imaging in the exposure period LV2 constitutes a second imaging control. The first period and the second period may partially overlap with each other. For example, a start timing of the exposure period EX and an end timing of the pixel row 62 at the lower end in the exposure period LV2 may match.

In a case where a region (hereinafter, referred to as a saturation region) in which pixels of which pixel values have reached a saturation value are concentrated in a predetermined area or larger is present in the captured image data obtained by imaging in the exposure period LV2, the system control unit 11 determines that the high-brightness region is included in the subject being imaged. In a case where the saturation region is not present in the captured image data, the system control unit 11 determines that the high-brightness region is not included in the subject being imaged.

In a case where a determination that the high-brightness region is not included in the subject being imaged is made, the system control unit 11 determines that there is no possibility of occurrence of the leaking charges that may affect the image quality of the captured image data in the signal readout period immediately after the exposure period EX. In a case where a determination that the high-brightness region is included in the subject being imaged is made, the system control unit 11 determines that there is a possibility of occurrence of the leaking charges that may affect the image quality of the captured image data in the signal readout period immediately after the exposure period EX. Hereinafter, a control example of the operation condition of the imaging unit 50 in the signal readout period will be described.

Control Example of F Number in Signal Readout Period

In a case where a determination that the high-brightness region is not included in the subject being imaged is made, the system control unit 11 maintains the F number of the stop 2 in the signal readout period immediately after the exposure period EX to be the same as a value set in the exposure period EX. In a case where a determination that the high-brightness region is included in the subject being imaged is made, the system control unit 11 sets the F number of the stop 2 in the signal readout period immediately after the exposure period EX to a value higher than the value set in the exposure period EX.

Accordingly, in the signal readout period, the quantity of the incidence ray on the light-receiving surface 60 of the imaging element 5 is reduced from that in the exposure period EX. Thus, the quality of the captured image data obtained by the imaging for storage can be improved by decreasing the amount of the leaking charges.

Control Example of ND Filter in Signal Readout Period

In a case where a determination that the high-brightness region is not included in the subject being imaged is made, the system control unit 11 maintains the transmittance of the ND filter in the signal readout period immediately after the exposure period EX to a value set in the exposure period EX. In a case where a determination that the high-brightness region is included in the subject being imaged is made, the system control unit 11 sets the transmittance of the ND filter in the signal readout period immediately after the exposure period EX to a value lower than the value set in the exposure period EX.

Accordingly, in the signal readout period, the quantity of the incidence ray on the light-receiving surface 60 of the imaging element 5 is reduced. Thus, the quality of the captured image data obtained by the imaging for storage can be improved by decreasing the amount of the leaking charges.

Control Example of Focus Lens in Signal Readout Period

In a case where a determination that the high-brightness region is not included in the subject being imaged is made, the system control unit 11 does not fix the position of the principal point of the focus lens in the signal readout period immediately after the exposure period EX. That is, the system control unit 11 controls the position of the principal point of the focus lens for the start of the subsequent exposure.

In a case where a determination that the high-brightness region is included in the subject being imaged is made, the system control unit 11 maintains the position of the principal point of the focus lens in the signal readout period immediately after the exposure period EX to that in the exposure period EX. That is, in a case where a determination that the high-brightness region is included in the subject being imaged is made, the system control unit 11 stops driving of the focus lens in the signal readout period.

By doing so, in the signal readout period, an image forming range of the high-brightness region of which an image is formed on the light-receiving surface 60 can be fixed to that in the exposure period EX. That is, in the signal readout period, an increase in the image forming range of the high-brightness region can be prevented. Since the image forming range is not increased, the number of pixels 61 into which a large amount of the leaking charges enters can be reduced, and the quality of the captured image data can be improved.

Control Example of Signal Readout Speed in Signal Readout Period

In a case where a determination that the high-brightness region is not included in the subject being imaged is made, the system control unit 11 sets a signal readout speed in the signal readout period immediately after the exposure period EX to a predetermined first speed. In a case where a determination that the high-brightness region is included in the subject being imaged is made, the system control unit 11 sets the signal readout speed in the signal readout period immediately after the exposure period EX to a second speed higher than the first speed.

By doing so, the signal readout period is shortened, and the amount of the leaking charges is reduced. Thus, the quality of the captured image data obtained by the imaging for storage can be improved. Changing of the signal readout speed can be performed by, for example, changing the number of conversion bits set in an analog to digital (AD) converter included in the signal processing circuit 64 or by changing a clock frequency of the AD converter.

Control Example of Signal Readout Order in Signal Readout Period

In a case where a determination that the high-brightness region is not included in the subject being imaged is made, the system control unit 11 sets a signal readout order in the signal readout period immediately after the exposure period EX to a predetermined order (for example, an order of readout from the upper end toward the lower end). In a case where a determination that the high-brightness region is included in the subject being imaged is made, the system control unit 11 determines the signal readout order in the signal readout period immediately after the exposure period EX based on a position of the pixel 61 in which the image of the high-brightness region is formed.

For example, in a case where a determination that the image of the high-brightness region is formed in a lower end part of the light-receiving surface 60 is made, the system control unit 11 performs a setting of sequentially reading out signals from the pixel row 62 at the lower end toward the upper end of the light-receiving surface 60. In addition, in a case where a determination that the image of the high-brightness region is formed in a center part of the light-receiving surface 60 is made, the system control unit 11 performs a setting of sequentially reading out signals from the pixel row 62 in the center part toward the lower end of the light-receiving surface 60, reading out signals from the pixel row 62 at the lower end, and then, sequentially reading out signals from the pixel row 62 at the upper end toward the pixel row 62 in the center part of the light-receiving surface 60.

By doing so, the signal of the pixel 61 that may have a large amount of the leaking charges is read out first. Thus, a time in which the charges are held in the charge holding unit 61B of the pixel 61 can be shortened. Consequently, the amount of the leaking charges caused by the presence of the high-brightness region can be reduced, and the quality of the captured image data obtained by the imaging for storage can be improved.

In the above description, the system control unit 11 detects the high-brightness region of the subject being imaged based on the captured image data obtained by the LV imaging in the exposure period LV2. As a modification example, the system control unit 11 may detect the high-brightness region based on the captured image data obtained in each of a plurality of times the LV imaging is performed before the exposure period EX.

For example, the system control unit 11 detects the high-brightness region based on the captured image data obtained by the LV imaging in the exposure period LV1, and detects the high-brightness region based on the captured image data obtained by the LV imaging in the exposure period LV2. In a case where a determination that the high-brightness region is included in the subject is made based on the captured image data obtained by the LV imaging in the exposure period LV1, and a determination that the high-brightness region is included in the subject is made based on the captured image data obtained by the LV imaging in the exposure period LV2, the system control unit 11 determines whether or not the high-brightness region of the subject is moving between the LV imaging in the exposure period LV1 and the LV imaging in the exposure period LV2.

Specifically, the system control unit 11 compares a position of a region in which the pixel value is saturated in the captured image data obtained by the LV imaging in the exposure period LV1 with a position of a region in which the pixel value is saturated in the captured image data obtained by the LV imaging in the exposure period LV2. In a case where these positions are separated by a distance threshold value or more, the system control unit 11 determines that the high-brightness region of the subject is moving. In a case where these positions are not separated by the distance threshold value or more, the system control unit 11 determines that the high-brightness region of the subject is not moving.

In a case where a determination that the high-brightness region of the subject is moving is made, the system control unit 11 determines that there is a possibility of occurrence of the leaking charges that may affect the image quality of the captured image data in the signal readout period immediately after the exposure period EX. In a case where a determination that the high-brightness region of the subject is not moving is made, the system control unit 11 determines that there is no possibility of occurrence of the leaking charges that may affect the image quality of the captured image data in the signal readout period immediately after the exposure period EX.

In a case where there is no change between the position of the high-brightness region in imaging in the exposure period LV1 and the position of the high-brightness region in imaging in the exposure period LV2, there is a strong possibility that the position of the high-brightness region in imaging in the exposure period EX also does not change. In the exposure period EX in which an exposure value higher than that in the LV imaging is set, the pixel value of the pixel 61 in which the image of the high-brightness region is formed reaches the saturation value. Thus, even in a case where the leaking charges are applied to the pixel 61 in which the image of the high-brightness region is formed in the signal readout period after the exposure period EX, the pixel value of the pixel 61 is already saturated. Thus, there is almost no effect on the image quality.

Accordingly, in a case where the position of the high-brightness region is not changing between a plurality of times imaging is performed before the exposure period EX, the effect on the image quality can be avoided even in a case where the F number of the stop 2, the transmittance of the ND filter, the position of the principal point of the focus lens, and the signal readout operation in the signal readout period are maintained to those in the exposure period EX.

On the other hand, in a case where the position of the high-brightness region is changing between a plurality of times imaging is performed before the exposure period EX, there is a strong possibility that the high-brightness region moves between the exposure period EX and the subsequent signal readout period. Thus, the effect of the leaking charges on the image quality in the signal readout period is increased, compared to that in a case where the high-brightness region is not moving.

Therefore, in a case where the position of the high-brightness region is changing between a plurality of times imaging is performed before the exposure period EX, the image quality of the captured image data obtained by the imaging for storage can be improved by changing at least one of the F number of the stop 2, the transmittance of the ND filter, the position of the principal point of the focus lens, or the signal readout operation in the signal readout period from that in the exposure period EX to reduce the quantity of the incidence ray on the light-receiving surface 60.

In the above description, the LV imaging for acquiring the captured image data for detecting the high-brightness region is performed by performing the same exposure for all of the pixels 61. However, for example, exposure may be changed between the first pixel row including the phase difference detection pixel and the second pixel row including only the normal pixel.

Specifically, the system control unit 11 performs a control of sequentially reading out signals from each group in a case where the plurality of pixels 61 are divided into a plurality of groups (for example, two groups of a first group including only the first pixel row and a second group including the second pixel row) in the LV imaging in the exposure period LV2, and acquires the captured image data configured with image data corresponding to each group.

The system control unit 11 performs imaging with a first exposure value (for example, the same value as the exposure value in the exposure period EX) for the first group including only the first pixel row, and performs imaging with a second exposure value lower than the first exposure value for the second group including the second pixel row. Changing of the exposure value here is performed by changing the exposure time or the imaging sensitivity. The system control unit 11 performs a display control of the live view image based on the image data corresponding to the first group, acquires the brightness distribution based on the image data corresponding to the second group, and detects the high-brightness region based on the brightness distribution.

By doing so, the live view image is obtained as an image captured with the exposure set by the user. Thus, quality of the live view image can be improved. Signals read out from the second pixel row are mainly used for a focus control. Thus, there is no effect on the live view image caused by decreasing the exposure value. Therefore, by decreasing the exposure value of the second pixel row to detect the high-brightness region in imaging in the exposure period LV2, the image quality of the live view image and of the captured image data obtained by the imaging for storage can be improved.

Next, a configuration of a smartphone that is another embodiment of the imaging apparatus according to the present invention will be described.

Figure 6:
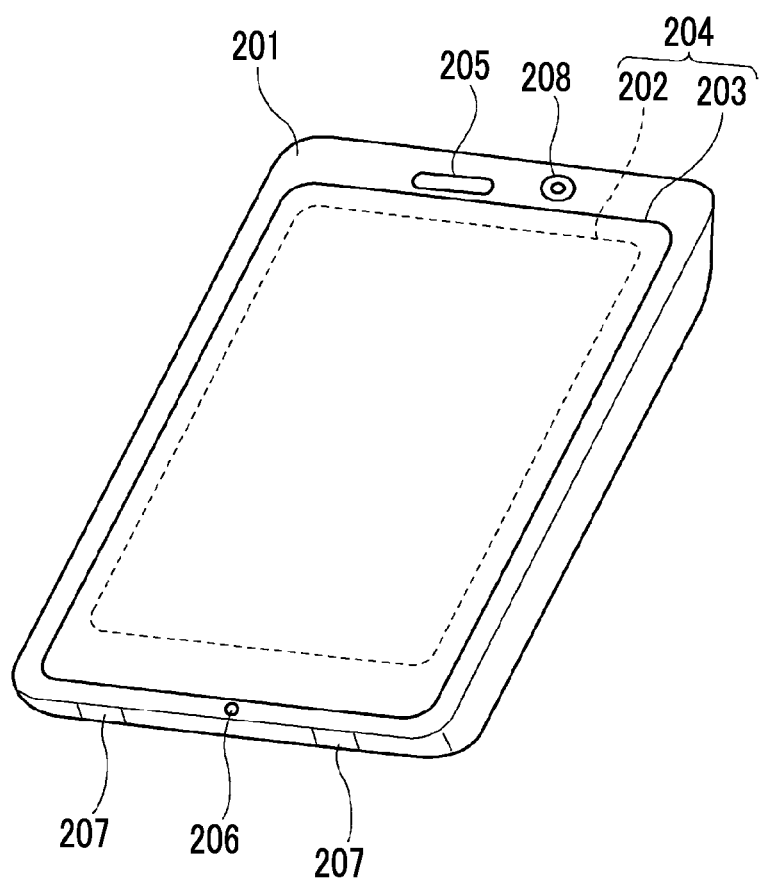
FIG. 6 is a diagram illustrating an exterior of a smartphone 200.

FIG. 6 illustrates an exterior of a smartphone 200. The smartphone 200 illustrated in FIG. 6 includes a casing 201 having a flat plate shape and comprises a display and input unit 204 in which a display panel 202 as a display unit and an operation panel 203 as an input unit are integrated on one surface of the casing 201.

The casing 201 comprises a speaker 205, a microphone 206, an operation unit 207, and a camera unit 208. The configuration of the casing 201 is not limited thereto and can employ, for example, a configuration in which the display unit and the input unit are independently disposed, or a configuration that has a folded structure or a sliding mechanism.

Figure 7:
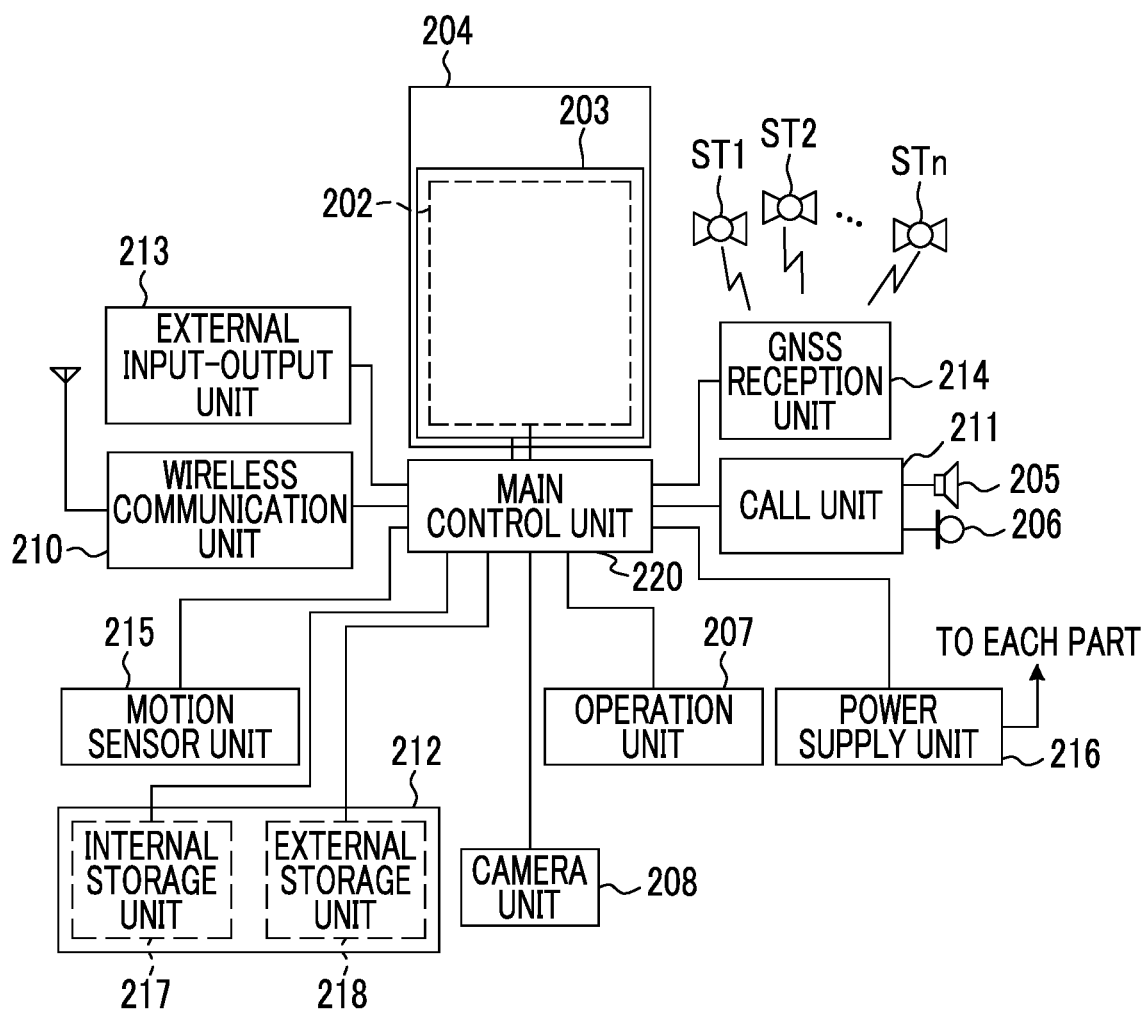
FIG. 7 is a block diagram illustrating a configuration of the smartphone 200 illustrated in FIG. 6.

FIG. 7 is a block diagram illustrating a configuration of the smartphone 200 illustrated in FIG. 6.

As illustrated in FIG. 7, a wireless communication unit 210, the display and input unit 204, a call unit 211, the operation unit 207, the camera unit 208, a storage unit 212, an external input-output unit 213, a global navigation satellite system (GNSS) reception unit 214, a motion sensor unit 215, a power supply unit 216, and a main control unit 220 are comprised as main constituents of the smartphone.

In addition, a wireless communication function of performing mobile wireless communication with a base station apparatus BS, not illustrated, through a mobile communication network NW, not illustrated, is provided as a main function of the smartphone 200.

The wireless communication unit 210 performs wireless communication with the base station apparatus BS accommodated in the mobile communication network NW in accordance with an instruction from the main control unit 220. By using the wireless communication, transmission and reception of various file data such as voice data and image data, electronic mail data, or the like and reception of web data, streaming data, or the like are performed.

The display and input unit 204 is a so-called touch panel that visually delivers information to the user by displaying images (still images and video images), text information, or the like and that detects a user operation with respect to the displayed information under control of the main control unit 220. The display and input unit 204 comprises the display panel 202 and the operation panel 203.

A liquid crystal display (LCD), an organic electro-luminescence display (OELD), or the like is used as a display device in the display panel 202.

The operation panel 203 is a device that is placed such that an image displayed on a display surface of the display panel 202 can be visually recognized, and that detects one or a plurality of coordinates operated with a finger of the user or with a stylus. In a case where the device is operated with the finger of the user or with the stylus, a detection signal generated by the operation is output to the main control unit 220. Next, the main control unit 220 detects an operation position (coordinates) on the display panel 202 based on the received detection signal.

As illustrated in FIG. 7, while the display panel 202 and the operation panel 203 of the smartphone 200 illustrated as one embodiment of the imaging apparatus according to the present invention are integrated to constitute the display and input unit 204, the operation panel 203 is disposed to completely cover the display panel 202.

In a case where such disposition is employed, the operation panel 203 may have a function of detecting the user operation even in a region outside the display panel 202. In other words, the operation panel 203 may comprise a detection region (hereinafter, referred to as a display region) for an overlapping part overlapping with the display panel 202 and a detection region (hereinafter, referred to as a non-display region) for an outer edge part, other than the overlapping part, that does not overlap with the display panel 202.

A size of the display region and a size of the display panel 202 may completely match, but both sizes do not need to match. In addition, the operation panel 203 may comprise two sensitive regions of the outer edge part and an inner part other than the outer edge part. Furthermore, a width of the outer edge part is appropriately designed depending on a size and the like of the casing 201.

Furthermore, examples of a position detection method employed in the operation panel 203 include a matrix switch method, a resistive membrane system, a surface acoustic wave method, an infrared method, an electromagnetic induction method, and a capacitance method. Any of the methods can be employed.

The call unit 211 comprises the speaker 205 or the microphone 206, and converts voice of the user input through the microphone 206 into voice data processable in the main control unit 220 and outputs the voice data to the main control unit 220, or decodes voice data received by the wireless communication unit 210 or by the external input-output unit 213 and outputs the decoded voice data from the speaker 205.

In addition, as illustrated in FIG. 6, for example, the speaker 205 can be mounted on the same surface as a surface on which the display and input unit 204 is provided, and the microphone 206 can be mounted on a side surface of the casing 201.

The operation unit 207 is a hardware key that uses a key switch or the like, and receives an instruction from the user. For example, as illustrated in FIG. 6, the operation unit 207 is a push button-type switch that is mounted on a side surface of the casing 201 of the smartphone 200, and that is set to an ON state in a case where the switch is pressed with the finger or the like and is set to an OFF state by restoring force of a spring or the like in a case where the finger is released.

In the storage unit 212, a control program and control data of the main control unit 220, application software, address data in which a name, a telephone number, or the like of a communication counterpart is associated, transmitted and received electronic mail data, web data downloaded by web browsing, and downloaded contents data are stored, and streaming data or the like is temporarily stored. In addition, the storage unit 212 is configured with an internal storage unit 217 incorporated in the smartphone and with an external storage unit 218 that includes a slot for an attachable and detachable external memory.

Each of the internal storage unit 217 and the external storage unit 218 constituting the storage unit 212 is implemented using a storage medium such as a memory (for example, a MicroSD (registered trademark) memory) of a flash memory type, a hard disk type, a multimedia card micro type, or a card type, a random access memory (RAM), or a read only memory (ROM).

The external input-output unit 213 functions as an interface with all external apparatuses connected to the smartphone 200 and is directly or indirectly connected to other external apparatuses by communication or the like (for example, a universal serial bus (USB), IEEE1394, Bluetooth (registered trademark), radio frequency identification (RFID), infrared communication (Infrared Data Association (IrDA) (registered trademark)), Ultra Wideband (UWB) (registered trademark), or ZigBee (registered trademark)) or through a network (for example, Ethernet (registered trademark) or a wireless local area network (LAN)).

For example, the external apparatuses connected to the smartphone 200 include a wired/wireless headset, a wired/wireless external charger, a wired/wireless data port, a memory card and a subscriber identity module (SIM)/user identity module (UIM) card connected through a card socket, an external audio and video apparatus connected through an audio and video input/output (I/O) terminal, a wirelessly connected external audio and video apparatus, a smartphone connected in a wired/wireless manner, a personal computer connected in a wired/wireless manner, and an earphone connected in a wired/wireless manner.

The external input-output unit 213 can deliver data transferred from the external apparatuses to each constituent in the smartphone 200 or transfer data in the smartphone 200 to the external apparatuses.

The GNSS reception unit 214 receives GNSS signals transmitted from GNSS satellites ST1 to STn, executes positioning computation processing based on the received plurality of GNSS signals, and detects a position consisting of a latitude, a longitude, and an altitude of the smartphone 200 in accordance with an instruction from the main control unit 220.

In a case where positional information can be acquired from the wireless communication unit 210 or from the external input-output unit 213 (for example, a wireless LAN), the GNSS reception unit 214 can detect the position using the positional information.

The motion sensor unit 215 comprises, for example, a three-axis acceleration sensor and detects a physical motion of the smartphone 200 in accordance with an instruction from the main control unit 220. By detecting the physical motion of the smartphone 200, a movement direction or acceleration of the smartphone 200 is detected. A detection result is output to the main control unit 220.

The power supply unit 216 supplies power stored in a battery (not illustrated) to each part of the smartphone 200 in accordance with an instruction from the main control unit 220.

The main control unit 220 comprises a microprocessor, operates in accordance with the control program and with the control data stored in the storage unit 212, and generally controls each part of the smartphone 200. The microprocessor of the main control unit 220 has the same function as the system control unit 11. In addition, the main control unit 220 has a mobile communication control function for controlling each part of a communication system and an application processing function for performing voice communication or data communication through the wireless communication unit 210.

The application processing function is implemented by operating the main control unit 220 in accordance with the application software stored in the storage unit 212. For example, the application processing function is an infrared communication function of performing data communication with counter equipment by controlling the external input-output unit 213, an electronic mail function of transmitting and receiving electronic mails, or a web browsing function of viewing a web page.

In addition, the main control unit 220 has an image processing function such as displaying an image on the display and input unit 204 based on image data (data of a still image or of a video image) such as reception data or downloaded streaming data.

The image processing function refers to a function of causing the main control unit 220 to decode the image data, perform image processing on the decoding result, and display the image on the display and input unit 204.

Furthermore, the main control unit 220 executes a display control of the display panel 202 and an operation detection control of detecting the user operation performed through the operation unit 207 and through the operation panel 203.

By executing the display control, the main control unit 220 displays an icon for starting the application software or for a software key such as a scroll bar or displays a window for creating an electronic mail.

The scroll bar refers to a software key for receiving an instruction to move a display part of a large image or the like that does not fit in the display region of the display panel 202.

In addition, by executing the operation detection control, the main control unit 220 detects the user operation performed through the operation unit 207, receives an operation with respect to the icon and an input of a text string in an input field of the window through the operation panel 203, or receives a request for scrolling the display image made through the scroll bar.

Furthermore, by executing the operation detection control, the main control unit 220 is provided with a touch panel control function of determining whether the operation position on the operation panel 203 is in the overlapping part (display region) overlapping with the display panel 202 or is in the other outer edge part (non-display region) not overlapping with the display panel 202 and of controlling the sensitive region of the operation panel 203 or a display position of the software key.

In addition, the main control unit 220 can detect a gesture operation with respect to the operation panel 203 and execute a function set in advance in accordance with the detected gesture operation.

The gesture operation is not a simple touch operation in the related art and means an operation of drawing a path with the finger or the like, designating a plurality of positions at the same time, or as a combination thereof, drawing a path for at least one of the plurality of positions.

The camera unit 208 includes the imaging unit 50 and the digital signal processing unit 17 illustrated in FIG. 1. In the smartphone 200, the main control unit 220 and the internal storage unit 217 constitute the imaging control device.

Captured image data generated by the camera unit 208 can be stored in the storage unit 212 or be output through the external input-output unit 213 or through the wireless communication unit 210.

In the smartphone 200 illustrated in FIG. 7, the camera unit 208 is mounted on the same surface as the display and input unit 204. However, a mount position of the camera unit 208 is not limited thereto. The camera unit 208 may be mounted on a rear surface of the display and input unit 204.

In addition, the camera unit 208 can be used in various functions of the smartphone 200. For example, an image acquired by the camera unit 208 can be displayed on the display panel 202, or the image of the camera unit 208 can be used as one of operation inputs of the operation panel 203.

In addition, in detecting the position via the GNSS reception unit 214, the position can be detected by referring to the image from the camera unit 208. Furthermore, by referring to the image from the camera unit 208, it is possible to determine an optical axis direction of the camera unit 208 of the smartphone 200 or to determine the current use environment without using the three-axis acceleration sensor or by using the three-axis acceleration sensor together. The image from the camera unit 208 can also be used in the application software.

In addition, image data of a still image or of a video image to which the positional information acquired by the GNSS reception unit 214, voice information (may be text information acquired by performing voice to text conversion via the main control unit or the like) acquired by the microphone 206, posture information acquired by the motion sensor unit 215, or the like is added can be stored in the storage unit 212 or be output through the external input-output unit 213 or through the wireless communication unit 210. Even in the smartphone 200 having the above configuration, the quality of the captured image data obtained by the imaging for storage can be improved.

EXPLANATION OF REFERENCES

1: imaging lens
2: stop
4: lens control unit
5 imaging element
8: lens drive unit
9: stop drive unit
11: system control unit
14, 207: operation unit
15 memory control unit
16: memory
17: digital signal processing unit
20 external memory control unit
21: storage medium
22a: display controller
22b: display surface
22: display device
24: control bus
25 data bus
40 lens device
50 imaging unit
60 light-receiving surface
61A: photoelectric conversion unit
61B: charge holding unit
61C: charge transfer unit
61D: floating diffusion
61E: circuit
61: pixel
62: pixel row
63: drive circuit
64: signal processing circuit
65 signal line
70 N-type substrate
71: P-well layer
72: electrode
73: N-type impurity layer
74: P-type impurity layer
75 region
76: transfer electrode
77: reset transistor
78: output transistor
79: selection transistor
100A: body part
100: digital camera
200: smartphone
201: casing
202: display panel
203: operation panel
204: display and input unit
205: speaker
206: microphone
208: camera unit
210: wireless communication unit
211: call unit
212: storage unit
213: external input-output unit
214: GNSS reception unit
215: motion sensor unit
216: power supply unit
217: internal storage unit
218: external storage unit
220: main control unit

What is claimed is:

1. An imaging control device that controls an imaging unit including an imaging element in which a plurality of pixels each including a photoelectric conversion unit and a charge holding unit which holds electric charges to be transferred from the photoelectric conversion unit are two-dimensionally disposed, the imaging control device comprising:

a processor,
wherein the processor is configured to:
perform a first control of starting exposure of the plurality of pixels at a first timing and of transferring electric charges accumulated in the photoelectric conversion units of the plurality of pixels by the exposure to the charge holding units at a second timing;
perform a second control of reading out signals corresponding to the electric charges transferred to the charge holding units by the first control; and
perform a third control of acquiring captured image data obtained by imaging a subject via the imaging element in a second period different from a first period in which the first control is performed, and of controlling, based on the captured image data, an operation condition of the imaging unit in a period in which the second control is performed, wherein the first period does not overlap with the second period, and wherein the processor is configured to:
  acquire a brightness distribution of the subject imaged by the imaging element based on the captured image data and control the operation condition based on the brightness distribution;
  based on the brightness distribution, detect a high-brightness region in which brightness is greater than or equal to a threshold value in the subject being imaged;
  acquire a plurality of pieces of the captured image data by executing imaging a plurality of times in the second period; and
  in a case where a determination that the high-brightness region detected based on the plurality of pieces of captured image data is moving between the plurality of times imaging is made, change the operation condition from a first condition to a second condition.

2. The imaging control device according to claim 1, wherein the second period is a period before the first timing, and
the processor is configured to acquire the captured image data in the second period by imaging the subject via the imaging element with an exposure value lower than an exposure value in the first period.

3. The imaging control device according to claim 1, wherein the processor is configured to:
in the imaging in the second period, perform, in a case where the plurality of pixels are divided into a plurality of groups, a control of reading out a signal from each of the groups, and acquire the captured image data configured with image data corresponding to each of the groups; and
perform imaging with a first exposure value for a first group that is a part of the plurality of groups, and perform imaging with a second exposure value lower than the first exposure value for a second group except the first group among the plurality of groups.

4. The imaging control device according to claim 3, wherein the processor is configured to:
perform a display control of a live view image based on the image data corresponding to the first group; and
acquire the brightness distribution based on the image data corresponding to the second group.

5. The imaging control device according to claim 1, wherein the imaging unit includes a first optical element with which a quantity of an incidence ray on the imaging element is changeable, and
the operation condition is a condition related to operation of the first optical element.

6. The imaging control device according to claim 5, wherein the third control includes a control of controlling the first optical element to decrease the quantity of the incidence ray in the period in which the second control is performed below the quantity of the incidence ray on the imaging element in a period in which the first control is performed.

7. An imaging apparatus comprising:
the imaging control device according to claim 1; and
the imaging unit.

8. An imaging control device that controls an imaging unit including an imaging element in which a plurality of pixels each including a photoelectric conversion unit and a charge holding unit which holds electric charges to be transferred from the photoelectric conversion unit are two-dimensionally disposed, the imaging control device comprising:
a processor,
wherein the processor is configured to:
  perform a first control of starting exposure of the plurality of pixels at a first timing and of transferring electric charges accumulated in the photoelectric conversion units of the plurality of pixels by the exposure to the charge holding units at a second timing;
  perform a second control of reading out signals corresponding to the electric charges transferred to the charge holding units by the first control; and
  perform a third control of acquiring captured image data obtained by imaging a subject via the imaging element in a second period different from a first period in which the first control is performed, and of controlling, based on the captured image data, an operation condition of the imaging unit in a period in which the second control is performed,
wherein the imaging unit includes a focus lens, and
wherein the operation condition is a condition related to operation of the focus lens.

9. The imaging control device according to claim 8, wherein the third control includes a control of stopping driving of the focus lens.

10. An imaging control device that controls an imaging unit including an imaging element in which a plurality of pixels each including a photoelectric conversion unit and a charge holding unit which holds electric charges to be transferred from the photoelectric conversion unit are two-dimensionally disposed, the imaging control device comprising:
a processor,
wherein the processor is configured to:
  perform a first control of starting exposure of the plurality of pixels at a first timing and of transferring electric charges accumulated in the photoelectric conversion units of the plurality of pixels by the exposure to the charge holding units at a second timing;
  perform a second control of reading out signals corresponding to the electric charges transferred to the charge holding units by the first control; and
perform a third control of acquiring captured image data obtained by imaging a subject via the imaging element in a second period different from a first period in which the first control is performed, and of controlling, based on the captured image data, an operation condition of the imaging unit in a period in which the second control is performed,
wherein the operation condition is a condition related to a readout operation of the signals from the charge holding units.

11. The imaging control device according to claim 10, wherein the third control includes a control of setting a readout speed of the signals from the charge holding units to a first speed and a control of setting the readout speed to a second speed higher than the first speed.

12. The imaging control device according to claim 10, wherein the operation condition is a condition related to a readout order of the signals from the charge holding units.

13. The imaging control device according to claim 12, wherein the processor is configured to acquire a brightness distribution of the subject imaged by the imaging element based on the captured image data, detect a high-brightness region based on the brightness distribution, and in a case where a determination that the high-brightness region is present is made, determine the readout order of the signals based on a position of the pixel in which an image of the high-brightness region is formed.

14. An imaging control device that controls an imaging unit including an imaging element in which a plurality of pixels each including a photoelectric conversion unit and a charge holding unit which holds electric charges to be transferred from the photoelectric conversion unit are two-dimensionally disposed, the imaging control device comprising:

a processor,
wherein the processor is configured to:
perform a first imaging control of imaging a subject via the imaging element with a first exposure value;
perform a second imaging control of imaging the subject via the imaging element with a second exposure value lower than the first exposure value; and
acquire a brightness distribution of the subject imaged by the imaging element based on captured image data acquired from the imaging element by the second imaging control and perform a specific control based on the brightness distribution.

15. The imaging control device according to claim 14, wherein the processor is configured to, based on the brightness distribution, detect a high-brightness region in which brightness is greater than or equal to a threshold value, and in a case where the high-brightness region is present, perform the specific control.

16. The imaging control device according to claim 15, wherein the processor is configured to:
acquire a plurality of pieces of the captured image data by executing the second imaging control a plurality of times; and
in a case where a determination that the high-brightness region detected based on the plurality of pieces of captured image data is moving between the plurality of times imaging is made, perform the specific control.

17. An imaging control device that controls an imaging unit including an imaging element in which a plurality of pixels each including a photoelectric conversion unit and a charge holding unit which holds electric charges to be transferred from the photoelectric conversion unit are two-dimensionally disposed, the imaging control device comprising:

a processor,
wherein the processor is configured to:
perform an imaging control of imaging a subject via the imaging element;
in imaging in the imaging control, perform, in a case where the plurality of pixels are divided into a plurality of groups, a control of reading out a signal from each of the groups, and acquire captured image data configured with image data corresponding to each of the groups;
perform imaging with a first exposure value for a first group that is a part of the plurality of groups, and perform imaging with a second exposure value lower than the first exposure value for a second group except the first group among the plurality of groups; and
acquire a brightness distribution of the subject imaged by the imaging element based on the captured image data and perform a specific control based on the brightness distribution.

18. The imaging control device according to claim 17, wherein the processor is configured to:
perform a display control of a live view image based on the image data corresponding to the first group; and
acquire the brightness distribution based on the image data corresponding to the second group.

19. An imaging control method for controlling an imaging unit including an imaging element in which a plurality of pixels each including a photoelectric conversion unit and a charge holding unit which holds electric charges to be transferred from the photoelectric conversion unit are two-dimensionally disposed, the imaging control method comprising:
performing a first imaging control of imaging a subject via the imaging element with a first exposure value;
performing a second imaging control of imaging the subject via the imaging element with a second exposure value lower than the first exposure value; and
acquiring a brightness distribution of the subject imaged by the imaging element based on captured image data acquired from the imaging element by the second imaging control and perform a specific control based on the brightness distribution.

20. A non-transitory computer readable medium storing an imaging control program for controlling an imaging unit including an imaging element in which a plurality of pixels each including a photoelectric conversion unit and a charge holding unit which holds electric charges to be transferred from the photoelectric conversion unit are two-dimensionally disposed, the imaging control program causing a processor to execute:
performing a first imaging control of imaging a subject via the imaging element with a first exposure value;
performing a second imaging control of imaging the subject via the imaging element with a second exposure value lower than the first exposure value; and
acquiring a brightness distribution of the subject imaged by the imaging element based on captured image data acquired from the imaging element by the second imaging control and perform a specific control based on the brightness distribution.

* * * * *